United States Patent
Johnson et al.

(10) Patent No.: US 11,159,458 B1
(45) Date of Patent: Oct. 26, 2021

(54) SYSTEMS AND METHODS FOR COMBINING AND SUMMARIZING EMOJI RESPONSES TO GENERATE A TEXT REACTION FROM THE EMOJI RESPONSES

(71) Applicant: Capital One Services, LLC, McLean, VA (US)

(72) Inventors: Kyle Johnson, Falls Church, VA (US); Kevin Osborn, Newton Highlands, MA (US); George Bergeron, Falls Churhc, VA (US); Eric Loucks, Tyson, VA (US); Brian Lee, South Riding, VA (US); Joshua Edwards, Philadelphia, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/897,806

(22) Filed: Jun. 10, 2020

(51) Int. Cl.
*H04L 12/58* (2006.01)

(52) U.S. Cl.
CPC ............. *H04L 51/02* (2013.01); *H04L 51/10* (2013.01)

(58) Field of Classification Search
CPC ....... H04L 51/16; H04L 51/18; H04L 51/046; H04L 51/32; H04L 51/10; H04L 51/36; H04L 51/02; H04M 1/72436; H04M 1/72439; H04N 5/232939; H04N 2007/145; H04W 4/12; A63F 13/92
See application file for complete search history.

(56) References Cited

U.S. PATENT DOCUMENTS

| | | | |
|---|---|---|---|
| 9,672,530 B2 | 6/2017 | Judd et al. | |
| 9,959,296 B1 | 5/2018 | Gubin et al. | |
| 10,311,144 B2 * | 6/2019 | Bellegarda | G06F 3/04817 |
| 10,635,752 B2 * | 4/2020 | Zhou | G06F 40/35 |
| 10,757,043 B2 * | 8/2020 | Gershony | H04L 51/18 |
| 10,771,419 B2 * | 9/2020 | Charignon | H04L 67/22 |
| 10,789,419 B2 * | 9/2020 | Upadhyay | H04L 51/16 |
| 10,880,243 B2 * | 12/2020 | Rodriguez | H04L 51/04 |
| 2007/0124202 A1 | 5/2007 | Simons | |
| 2010/0114887 A1 | 5/2010 | Conway et al. | |
| 2011/0282952 A1 | 11/2011 | Song | |
| 2013/0085747 A1 | 4/2013 | Li et al. | |

(Continued)

FOREIGN PATENT DOCUMENTS

| | | |
|---|---|---|
| EP | 3258397 A1 | 12/2017 |
| WO | 2014093911 A2 | 6/2014 |

(Continued)

*Primary Examiner* — Sargon N Nano
(74) *Attorney, Agent, or Firm* — Hunton Andrews Kurth LLP

(57) ABSTRACT

Example embodiments of messaging systems and methods are provided. An example system includes a database containing a plurality of messages, a plurality of emoji responses, and a plurality of text reactions. The system further includes a predictive model trained using the plurality of messages and the plurality of emoji responses as inputs and the plurality of text reactions as outputs to determine a mapping relationship between the inputs and the outputs. The predictive model receives a message and one or more emoji responses to the message, combines and summarizes the one or more emoji responses to a text reaction to the message based on the mapping relationship, and transmits the text reaction to a user who initiates the message.

20 Claims, 8 Drawing Sheets

(56) References Cited

U.S. PATENT DOCUMENTS

| | | |
|---|---|---|
| 2014/0181109 A1 | 6/2014 | Lin et al. |
| 2014/0316766 A1 | 10/2014 | Bao et al. |
| 2015/0019200 A1 | 1/2015 | Woodward et al. |
| 2015/0149385 A1 | 5/2015 | Sundaresan et al. |
| 2015/0242391 A1 | 8/2015 | Goel et al. |
| 2015/0263999 A1 | 9/2015 | Levin et al. |
| 2016/0170973 A1 | 6/2016 | Zhang et al. |
| 2017/0169016 A1 | 6/2017 | Bao et al. |
| 2017/0185581 A1* | 6/2017 | Bojja .................. G06K 9/6269 |
| 2017/0220675 A1 | 8/2017 | Kadashevich et al. |
| 2017/0222961 A1* | 8/2017 | Beach .................... H04L 51/02 |
| 2017/0336926 A1* | 11/2017 | Chaudhri ............ G06F 3/04845 |
| 2018/0081515 A1* | 3/2018 | Block ................ G06F 3/04817 |
| 2018/0165357 A1 | 6/2018 | Chakra et al. |
| 2018/0203846 A1 | 7/2018 | Cohen et al. |
| 2018/0348890 A1 | 12/2018 | Yang et al. |
| 2018/0351896 A1 | 12/2018 | Abou Mahmoud et al. |
| 2018/0365230 A1 | 12/2018 | Jang |
| 2019/0087466 A1 | 3/2019 | Wang et al. |
| 2020/0396187 A1* | 12/2020 | Woo ....................... H04L 51/02 |
| 2021/0055128 A1* | 2/2021 | Venkatakrishnan .... H04L 51/18 |
| 2021/0103610 A1* | 4/2021 | Lee ...................... G06F 16/435 |

FOREIGN PATENT DOCUMENTS

| | | |
|---|---|---|
| WO | 2015027909 A1 | 3/2015 |
| WO | 2018195875 A1 | 11/2018 |

\* cited by examiner

SYSTEMS AND METHODS FOR COMBINING AND SUMMARIZING EMOJI RESPONSES TO GENERATE A TEXT REACTION FROM THE EMOJI RESPONSES

FIELD OF THE INVENTION

The present disclosure relates to messaging technology, and more particularly, to systems and methods for combining and summarizing emoji responses to generate a text reaction from the emoji responses.

BACKGROUND

Emojis generally refer to ideograms used in electronic messages and web pages to indicate certain meanings. Emojis can take various picture-like forms, such as, facial expressions, common objects, places and types of weather, and animals. Emojis are growing in popularity among users who use electronic messages such as instant messages and emails to express their modes and thoughts. Unlike text, emojis however may cause some meaning ambiguities and be misunderstood. For example, emojis may take on culture-specific meanings and may be interpreted differently by different users.

In addition, users with impairments that render the interpretation and use of emojis, difficult, such as impaired vision, may tend to use screen readers to help them navigate the Internet, and to interact with others on messaging platforms. Screen readers can be incredibly verbose and spend a significant amount of time reading out small details. For instance, when screen readers are used on messaging platforms, the screen reader may slowly read through each of the emoji names that are sent in a message or that are used to react to a message. These emojis may lack clarity on their own, which can be made worse by the use of the screen reader.

Accordingly, there is a need for systems and methods that facilitate interpreting and understanding emojis properly such that users can communicate each other effectively by using emojis. For example, systems and methods disclosed herein may be used to combine and summarize emoji responses to generate a text reaction from the emoji responses to help users understand the emoji responses properly and clearly based on the generated text message.

SUMMARY

Aspects of the disclosed technology include systems and methods for combining and summarizing emoji responses to generate a text reaction from the emoji responses. Various embodiments of systems and methods are provided for implementing and managing combination and summarizing of emoji responses to generate a text reaction from the emoji responses.

Embodiments of the present disclosure provide a messaging system. The system comprises a database containing a plurality of messages, a plurality of emoji responses, and a plurality of text reactions. At least one of the plurality of emoji responses corresponds to each of the plurality of messages, at least one of the plurality of text reactions corresponds to each of the plurality of messages, and each of the plurality of text reactions is generated by combining corresponding emoji responses of the plurality of emoji responses. The system further comprises a predictive model trained using the plurality of messages and the plurality of emoji responses as inputs and the plurality of text reactions as outputs. The predictive model is configured to: determine a mapping relationship between the inputs and the outputs, receive a first message from a first user application comprising instructions for execution on a first user device, receive one or more emoji responses to the first message from a second user application comprising instructions for execution on a second user device, combine the one or more emoji responses to the first message based on the mapping relationship to generate at least one selected from the group of words and phrases, summarize the one or more emoji responses to the first message based on the mapping relationship to generate a text sentiment reaction, generate a text reaction to the first message by integrating the text sentiment reaction with the generated at least one selected from the group of words and phrases, and transmit the text reaction to the first message to the first user application on the first user device.

Embodiments of the present disclosure provide a method for combining and summarizing emoji responses to get a text reaction from the emoji responses. The method comprises: training a predictive model using a plurality of messages and a plurality of emoji responses as inputs and a plurality of text reactions as outputs to determine a mapping relationship between the inputs and the outputs; receiving, by the predictive model, a first message from a first user application comprising instructions for execution on a first user device; receiving, by the predictive model, one or more emoji responses to the first message from a second user application comprising instructions for execution on a second user device; combining, by the predictive model, the one or more emoji responses to the first message based on the mapping relationship to generate at least one selected from the group of words and phrases; summarizing, by the predictive model, the one or more emoji responses to the first message based on the mapping relationship to generate a text sentiment reaction; generating, by the predictive model, a text reaction to the first message by integrating the text sentiment reaction with the generated at least one selected from the group of words, and phrases; and transmitting, by the predictive model, the text reaction to the first message to the first user application on the first user device. The plurality of messages, the plurality of emoji responses, and the plurality of text reactions are stored in a database, at least one of the plurality of emoji responses corresponds to each of the plurality of messages, at least one of the plurality of text reactions corresponds to each of the plurality of messages, and each of the plurality of text reactions is generated by combining corresponding emoji responses of the plurality of emoji response.

Embodiments of the present disclosure provide a device for combining and summarizing emoji responses to get a text reaction from the emoji responses. The device comprises a processor, a display coupled to the processor, and a memory coupled to the processor. The processor is configured to: send, via the user application, a message to a recipient device; receive, via the user application, one or more emoji responses to the message from the recipient device; receive, via the user application, a text reaction to the message from a server, wherein the text reaction is generated by the server by combining and summarizing the one or more emoji responses; and present, via the user application, the text reaction on the display to a user.

Further features of the disclosed invention, and the advantages offered thereby, are explained in greater detail here-

DETAILED DESCRIPTION OF EXAMPLE EMBODIMENTS

Figure 1:
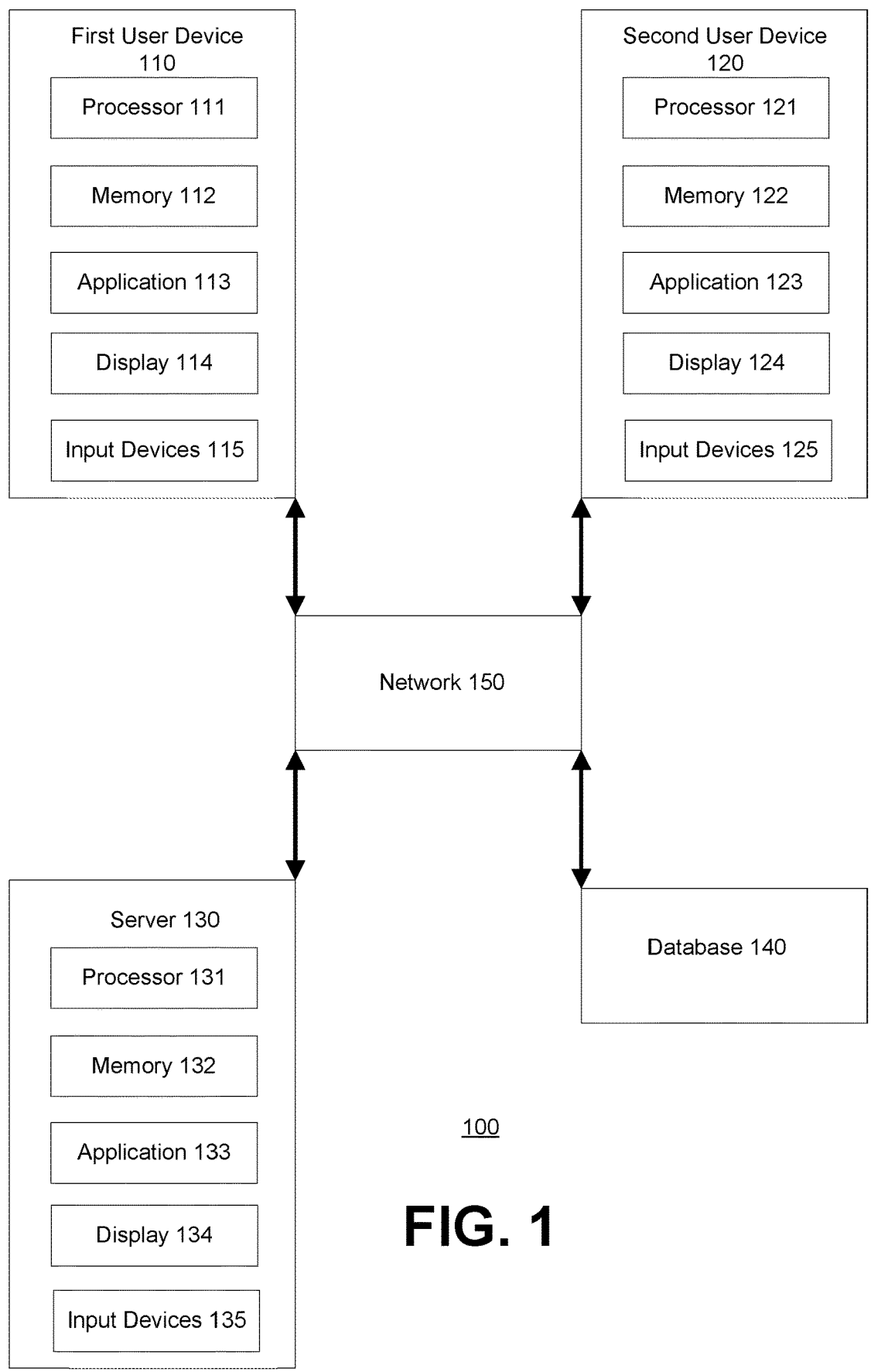
FIG. 1 is a diagram of a system for combining and summarizing emoji responses to generate a text reaction from the emoji responses according to an example embodiment.

The following description of embodiments provides non-limiting representative examples referencing numerals to particularly described features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Example embodiments of the present disclosure provide systems, devices and methods for combining and summarizing emoji responses to generate a text reaction from the emoji responses that can effectively and efficiently facilitate users to understand the emoji responses properly and clearly and to better understand how other users respond to an originating message to which the emojis are used to respond. Users may use any messaging platforms to send messages to recipients and to receive from the recipients emoji responses to the sent messages. The sent messages may include texts, emojis and/or the combinations thereof. The responses to the sent message may also include texts, emojis and/or the combinations thereof. The message originators and message recipients may use the same or different messaging platform. For example, a message originator may use a messaging platform running on Apple IOS® system (e.g., Apple Messenger®) and a message recipient may use a different messaging plat running on Android® system. The messaging platforms may include, but not limited to, Slack®, Facebook®, Twitter®, WeChat®, WhatsApp®, any email systems, and the like. In some embodiments, the emojis may be created and customized by the users and then uploaded by the users to the messaging server.

A predictive model may be used to combine and summarize emoji responses to a sent message to generate a text reaction to the sent message such that the message originator can be facilitated to understand the emoji responses properly and clearly based on the generated text reaction. The predictive model may comprises one or more machine learning (ML) models. Large amounts of messages sent on messaging platforms (e.g., Slack®), along with emoji responses that are provided to the sent messages, can be used to train the predictive model. The predictive model can be trained to recognize what types of emoji responses will be received from various messages. The predictive model is trained to interpret the emoji responses to: combine multiple emoji responses to a single sent message to generate words/phrases from the multiple emojis; and generate an overall sentiment of reactions to the single sent message.

In an example, if a message recipient reacts to a message with multiple emojis to spell out a word or phrase, such as "A", "G", "R", "E", "E", "D", each of those emojis may lack any particular meaning individually, but together, provide a response message of "agreed", which may have a substantial meaning to the message sender. A subset of emojis that are required to be combined (e.g., letters and numbers), may be defined in a messaging platform, and the predictive model may be capable of processing such emojis to translate them into the appropriate characters. For instance, emojis of letters could take the form of: _a:, :-a, or :a:, and those emojis of letters can be converted by the predictive model to the desired characters (i.e., a letter "a"). The predictive model can combine these characters to form the words/phrases that are intended by those emojis of letters. In this example, rather than dealing with each letter individually, a combined emoji reaction of "agreed" is obtained.

In addition, the predictive model can be configured to conduct sentiment analysis on the emoji responses to generate, for example, an overall consensus of how people react to a message. For example, rather than hearing a screen reader explain that there are three "smiling" reactions, two "conga parrot" reactions, and four "A", "G", "R", "E", "E", "D" reactions, the predictive model can summarize those emoji responses to be one overall sentiment reaction of "happiness, agreement" to the message. This summarization can be presented to the message originator in multiple forms: a private message to the original poster from a Slack® or other messaging platform bot, an automatic reply to the message itself, or through an alert that is dynamically added to a HTML or XML document element via document object model (DOM) manipulations.

As a result, the systems and methods disclosed herein can enable a user to easily understand the overall reaction to an original message and provide particular benefit to users with read difficulties due to, e.g., impaired vision. For example, rather than listening to a screen reader read out emoji reactions for each message, such as, "Conga parrot, conga parrot, hyphen A, underscore G, underscore R, . . . ", the user with impaired vision would be able to receive a single text-based sentiment reaction conveyed about how others react to the user's original message. Therefore, embodiments of this invention can improve accessibility services for users with the vision impaired, which saves users' time, and can improve the overall experiences of users engaging with messaging platforms.

In addition, the predictive model can be trained to react appropriately for emojis. One advantage of being able to train the predictive model and being able to proactively predict what the emoji responses might be to an originating message is to facilitate the sender of the originating message to edit the originating message so that the sender is able to get the desired emoji responses. Therefore, the sender of the originating message may be able to get desired emotion and/or voice from the emoji responses. For example, a user may not be able to predict how people are going to respond to sent messages, so being able to have the predictive model that is trained to predict which emojis might react to the sent message, will be helpful in ensuring that a message is being interpreted by the recipient as the sender intends. For example, instances where a message intended to be factual is interpreted harshly may be avoided, and instances where a message that is intended to be firm is not interpreted as soft. Not coming across too harshly when it is meant factually, or not coming across too soft when it is intended to be firm. It helps to properly adjust the voice and the emotion of the messages. As another example, the predictive model may be applied to messages containing emojis that are being composed by the user and may predict the likely interpretation of the emojis if the message as currently composed. In this way, the predictive model may assist a user who may have difficulties using emojis to compose messages using emojis that will be interpreted as the user intends.

When training the predictive model, some emojis may be considered as invalid. For example, such emojis on their own do not actually create a coherent thought. Some of such emojis are, for instance, pictures that are needed to put two or three of them together to create the full scenic panorama. There are emojis for individual characters whether they are numbers or letters, which can be alpha numeric either way. For instance, a user might respond to a message with the emoji of underscore one, the emoji of underscore 0 and then the emoji of dash 0 in order to create the number 100. Separately, another user might respond to the message with underscore A, underscore W, underscore E, underscore S, underscore O, underscore M, and dash E in order to spell out the word "awesome".

The predictive model is configured to be able to combine these individual character emojis in order to create a word emoji. That word emoji may or may not be added to the response message as an emoji itself. It might instead be used only in the overall sentiment training. Alternatively, a browser extension or the like can be created to manipulate the word emoji for screen readers and to combine those so the screen reader is not trying to read out each of these character emojis individually but instead is able to combine them into a single word emoji.

To train the predictive model, a subset of emojis that are identified as invalid on their own are recognized. Such emojis may be automatically identified, based on them being a special character with an alpha numeric character afterwards. Alternatively, a database or a list can be used to include all of the emojis that need to be combined. The predictive model is configured to search the emojis to be in conjunction with each other and to preserve the ordering of them. The predictive model can map the actual emoji itself to the root value of it. For instance, an emoji "underscore A" can be mapped to a letter "A", and an emoji "dash A" can be mapped to a letter "A". The predictive model would combine all of the root values together and compare that to a dictionary to see if it is a valid term. For example, the combined root value "awesome" can be compared to a dictionary in which it can be identified to be a valid term.

In some embodiments, there may have some non-character emojis between character emojis. For example, a conga parrot emoji may appear between character emojis "-A" "-W" and character emojis "-E", "-S", "-O", "-M", "-E". The predictive model may ignore the non-character emojis and combine the character emojis to be a term if the term is a valid term. That is, the predictive model can be configured to skip the non-character emojis and attempt to combine the character emojis. Alternatively, if the term obtained by ignoring the non-character emoji is not a valid term, the predictive model may identify the non-character emoji as any type of emoji inserted in between two terms. In this way, the non-character emoji can be a special way that breaks the emojis into multiple words. That is, if the term combined by jumping over the non-character emojis is not in the dictionary, then the predictive model can look to see if each term separated by the non-character emojis is in the dictionary separately.

Once the individual emojis are combined into a valid term, a screen reading tool can be used to replace the individual emojis for that person with impaired eyesight. For example, the reading tool can remove the document object model (DOM) elements and replace it with a combined "awesome" emoji. In some embodiments, the terms may be further used into a sentiment learning analysis tool of the predictive model. Each term can be mapped to one of: "a positive sentiment", "a negative sentiment", "it's happy", "it's angry", and so forth. The sentiment analysis tool can be any suitable natural language processing (NLP) tools that would allow for mapping of those terms. The terms can also be combined with other emojis, for example, non-character emojis. The other emojis may be mapped to various sentiments. For example, a conga parrot means "happy" and a sad parrot means "angry" or the like. An overall sentiment of combining the term and the other emojis may be obtained by the predictive model. The overall sentiment can be sent as a direct message to the person who has sent the original message to let them know here's the overall sentiment—happy and agreeable. The overall sentiment can also be part of the screen reader, so instead of there being several emojis (some of which are combined terms), a single overall sentiment can be put in place. The overall sentiment can also be inserted into a browser extension as a sentiment icon or something of that nature, such that the overall sentiment can be displayed, for example by hovering a mouse over the sentiment icon.

In some embodiments, a sentiment score may be assigned to the overall sentiment. For example, when the sentiment analysis is performed on multiple emojis and/or terms, one emoji may outweigh another emoji. For example, different types of clearly positive emojis may be mixed with one negative term (e.g., boo), then the different types of positive emojis may outweigh the negative term to give an overall positive sentiment score to the overall sentiment. In another example, if an expletive term is spelled out as a negative response to an original message, and afterwards a single smiley face is received as an emoji response to the original message, then the spelled out term may outweigh the single smiley face emoji to give a negative sentiment score to the overall sentiment.

The sentiment score may be a numeric score. The numeric score may be further mapped to a terminology, for example some type of vernacular used for a screen reader. As in the example above where the term f-bomb is spelled out and a smiley face emoji is received, the NLP engine might give the term a negative score of −30 or the like, whereas the emoji sentiment analysis might give the smiley face emoji a positive score of +1 because it is a standard smiley face. Those two scores can be simply combined to get an overall score of −29. A type of vernacular may map the −29 negative score to "very bad". Accordingly, an overall sentiment score can be calculated for multiple different emotions—happy, sad, angry, which may depend on the weighting of each emotion —some of that mixed emotions. And the overall sentiment score may also depend on how multiple emotions cross different thresholds. For example, if there have a score of 10 in the happiness sentiment, a score of 10 in the sadness sentiment, and a score of 10 in the outrage sentiment, then an example of mixed emotion can be obtained.

In some embodiments, the overall sentiment score may be a percentage of categorization, which can be reported. For example, this message is 80% positive and 10% angry. For example, the NLP may give an 80% confidence that this is positive and the emojis sentiment analysis may give a 10% confidence that this is positive. The two percentages may be combined to obtain an overall percentage, or one percentage may outweigh the other (e.g., an 80% confidence that this is a positive thing). Such percentage may be mapped and hidden when it is used in a user interface (UI). If the percentage is over a certain threshold, the UI may indicate as "positive". And if the percentage is between other ranges, a different term may be indicated in the UI. If the percentage is below the other range, the UI may indicate "uncertain" or "unclear".

FIG. 1 illustrates a system 100 for combining and summarizing emoji responses to generate a text reaction from the emoji responses according to an example embodiment. As further discussed below, the system 100 may include a first user device 110, a second device 120, a server 130, and a database 140 in communication via a network 150. Although FIG. 1 illustrates single instances of the components, the system 100 may include any number of components.

In some examples, the first user device 110 and second user device 120 can each be associated with a user and may be operated by that user. The corresponding user may operate the first user device 110 or second user device 120 to send or receive a message, and to interact with the server 130. For example, the first user device 110 may send a message to the second user device 120 through the server 130. The second user device 120 may be operated by the corresponding user to provide responses to the message to the first user device 110 through the server 130.

In some embodiments, the server 130 may be configured to receive messages and responses to the messages from the first user device 110 and second user device 120 and to communicate with the database 140 to analyze the messages and the responses. The server 130 may further be configured to transmit analysis results of the messages and responses to the first user device 110 and/or the second user device 120.

The first user device 110 and second user device 120 may each be a network-enabled computer device that is capable of being configured to send and receive messages/responses to the messages. Exemplary network-enabled computer devices may include, without limitation, a server, a network appliance, a personal computer, a laptop computer, a tablet computer, a workstation, a phone, a handheld personal computer, a smartcard, a personal digital assistant, a thin client, a fat client, an Internet browser, a mobile device, a kiosk, or other computer devices or communications devices. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The first user device 110 and second user device 120 may respectively include a processor 111 and 121, a memory 112 and 122, an application 113 and 123, a display 114 and 124, and input devices 115 and 125. The processor 111 and 121 may be a processor, a microprocessor, or other processor, and the first user device 110 and second user device 120 may each include one or more of these processors. The processor 111 and 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 and 121 may be coupled to the memory 112 and 122 respectively. The memory 112 and 122 may be a read-only memory, write-once read-multiple memory or read/write memory, e.g., RAM, ROM, and EEPROM, and the user device 110 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 112 and 122 may be configured to store one or more software applications, such as the application 113 and 123, and other data, such as private information and telephone numbers.

The application 113 and 123 may comprise one or more software applications comprising instructions for execution on the first user device 110 and second user device 120 respectively. In some examples, the first user device 110 and second user device 120 may each execute one or more applications, such as software applications, that enable, for example, network communications with one or more components of the system 100, transmit and/or receive data, and perform the functions described herein. Upon execution by the processor 111 and 121, the application 113 and 123 may provide the functions described in this specification, specifically to execute and perform the steps and functions in the process flows described below. Such processes may be implemented in software, such as software modules, for execution by computers or other machines. The application 113 and 123 may provide graphic user interfaces (GUIs) through which a user may view and interact with other components and devices within the system 100. The GUIs may be formatted, for example, as web pages in HyperText Markup Language (HTML) or Extensible Markup Language (XML), a dialog box, a messaging platform or in any other suitable form for presentation on the display 114 and 124 depending upon applications used by users to interact with the system 100.

The display 114 and 124 may be any type of device for presenting visual information such as a computer monitor, a flat panel display, and a mobile device screen, including liquid crystal displays, light-emitting diode displays, plasma panels, and cathode ray tube displays. The input devices 115 and 125 may include any device for entering information into the first user device 110 and second user device 120 that is available and supported by the first user device 110 and second user device 120, such as a touch-screen, keyboard, mouse, cursor-control device, microphone, digital camera, video recorder or camcorder. These devices may be used to enter information and interact with the software and other devices described herein.

The server 130 may be a network-enabled computer device. Exemplary network-enabled computer devices may include, without limitation, a server computer, a network appliance, a personal computer, a laptop computer, a tablet computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 130 may include a processor 131, a memory 132, and an application 133. The processor 131 may be a processor, a microprocessor, or other processor, and the server 130 may include one or more of these processors. The processor 131 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 131 may be coupled to the memory 132. The memory 132 may be a read-only memory, write-once read-multiple memory or read/write memory, e.g., RAM, ROM, and EEPROM, and user deice may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 132 may be configured to store one or more software applications, such as application 133, and other data, such as private information and telephone numbers.

The application 133 may comprise one or more software applications comprising instructions for execution on the server 130. For example, the application 133 may comprise one or more predictive models such as various ML models that are capable of analyzing messages and responses to the messages. In some examples, the server 130 may execute one or more applications, such as software applications, that enable, for example, network communications with one or more components of the system 100, transmit and/or receive data, and perform the functions described herein. Upon execution by the processor 131, the application 133 may provide the functions described in this specification, specifically to execute and perform the steps and functions in the process flows described below. Such processes may be implemented in software, such as software modules, for execution by computers or other machines. The application 133 may provide graphic user interfaces (GUIs) through which a user may view and interact with other components and devices within the system 100. The GUIs may be formatted, for example, as web pages in HyperText Markup Language (HTML) or Extensible Markup Language (XML), a dialog box, a messaging platform, or in any other suitable form for presentation on the display 134 depending upon applications used by users to interact with the system 100.

The server 130 may further include the display 134 and input devices 135. The display 134 may be any type of device for presenting visual information such as a computer monitor, a flat panel display, and a mobile device screen, including liquid crystal displays, light-emitting diode displays, plasma panels, and cathode ray tube displays. The input devices 135 may include any device for entering information into the server 130 that is available and supported by the server 130, such as a touch-screen, keyboard, mouse, cursor-control device, microphone, digital camera, video recorder or camcorder. These devices may be used to enter information and interact with the software and other devices described herein.

The database 140 may be one or more databases configured to store data, including without limitation, private information, telephone numbers, messages and responses to the messages, and analysis results of the messages and responses. The database 140 may comprise a relational database, a non-relational database, or other database implementations, and any combination thereof, including a plurality of relational databases and non-relational databases. In some examples, the database 140 may comprise a desktop database, a mobile database, or an in-memory database. Further, the database 140 may be hosted internally by the server 130 or may be hosted externally of the server 130, such as by a server device, by a cloud-based platform, or in any storage device that is in data communication with the server 130.

The system 100 may include one or more networks 150. In some examples, the network 150 may be one or more of a wireless network, a wired network or any combination of wireless network and wired network, and may be configured to connect the first user device 110, the second user device 120, the server 130, and the database 140. For example, the network 150 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 150 may include, without limitation, telephone lines, fiber optics, IEEE Ethernet 902.3, a wide area network, a wireless personal area network, a LAN, or a global network such as the Internet. In addition, the network 150 may support an Internet network, a wireless communication network, a cellular network, or the like, or any combination thereof. The network 150 may further include one network, or any number of the exemplary types of networks mentioned above, operating as a stand-alone network or in cooperation with each other. The network 150 may utilize one or more protocols of one or more network elements to which they are communicatively coupled. The network 150 may translate to or from other protocols to one or more protocols of network devices. Although the network 150 is depicted as a single network, it should be appreciated that according to one or more examples, the network 150 may comprise a plurality of interconnected networks, such as, for example, the Internet, a service provider's network, a cable television network, corporate networks, such as credit card association networks, and home networks. The network 150 may further comprise, or be configured to create, one or more front channels, which may be publicly accessible and through which communications may be observable, and one or more secured back channels, which may not be publicly accessible and through which communications may not be observable.

In some examples, communications between the first user device 110, the second user device 120, and the server 130 via the network 150 can occur via one or more front channels and one or more secure back channels. A front channel may be a communication protocol that employs a publicly accessible and/or unsecured communication channel such that a communication sent to the first user device 110, second user device 120, and/or server 130 may originate from any other device, whether known or unknown to the first user device 110, second user device 120, and/or server 130, if that device possesses the address (e.g., network address, Internet Protocol (IP) address) of the first user device 110, the second user device 120, and/or server 130. Exemplary front channels include, without limitation, the Internet, an open network, and other publicly-accessible communication networks. In some examples, communications sent via a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. A secure back channel communication sent to the first user device 110, second user device 120, and/or server 130 may not originate from any device, and instead may only originate from a selective number of parties. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent via a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

In some embodiments, the one or more predictive models may be executed on the client side (e.g., the first user device 110 and/or the second user device 120) or on the client side as well as the server 130. In such embodiments, the client side (e.g., the first user device 110 and/or the second user device 120) can comprise specialized ML model execution hardware as well as advanced CPU and GPU models used in general purpose computers.

Figure 2:
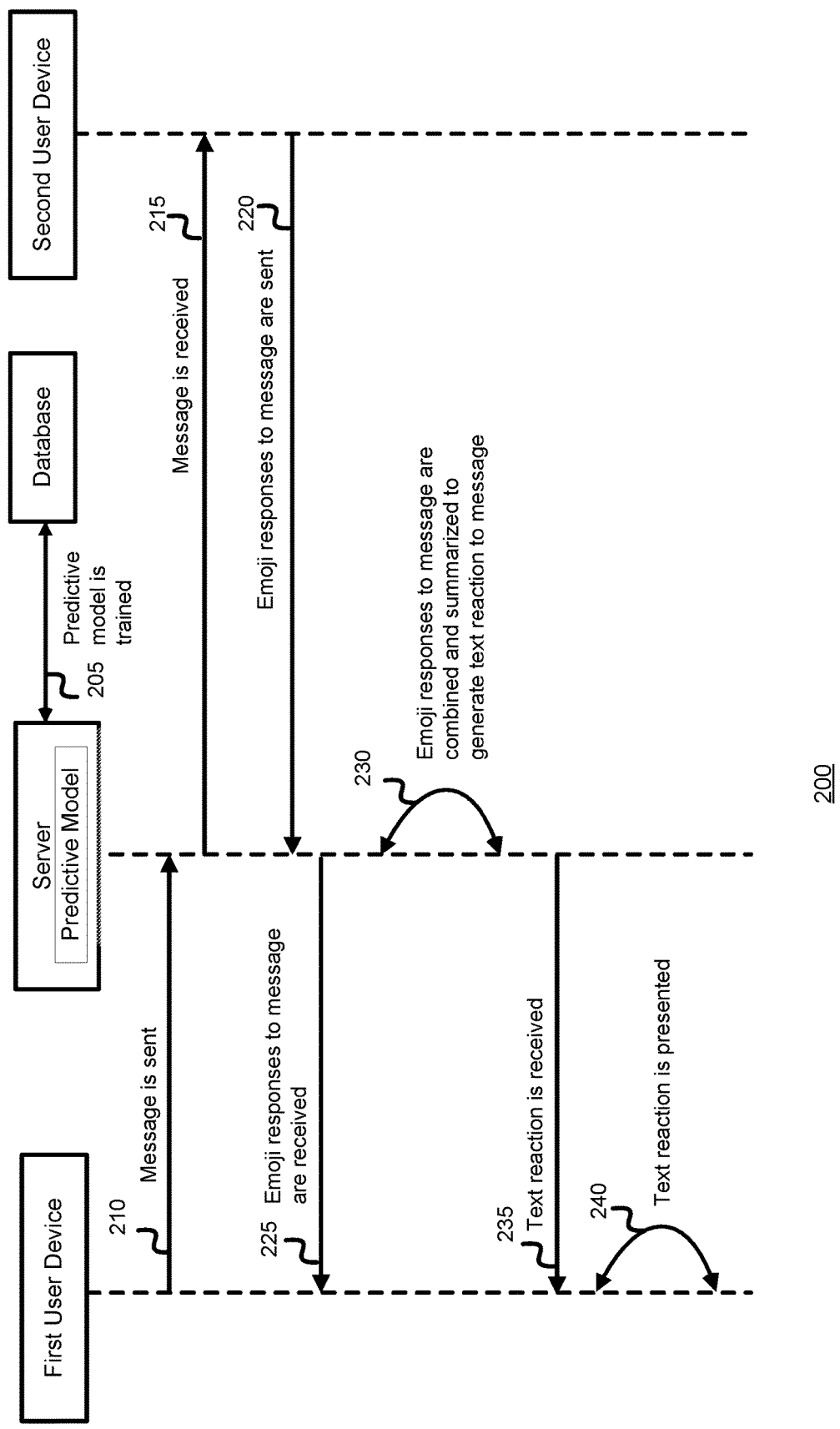
FIG. 2 is a sequence diagram for combining and summarizing emoji responses to generate a text reaction from the emoji responses according to an example embodiment.

FIG. 2 illustrates a sequence diagram for a method 200 of combining and summarizing emoji responses to generate a text reaction from the emoji responses according to an example embodiment. FIG. 2 may reference the same or similar components as those illustrated in FIG. 1, including a first user device, a second user device, a server and a database.

The method 200 may commence at step 205, where a predictive model comprising an application (e.g., the application 133) on a server (e.g., the server 130) may be trained. The predictive model may be trained using training data to determine a mapping relationship between the training data. The training data may be stored in a database (e.g., the database 140 in FIG. 1). In this example, the training data may comprise a plurality of messages, a plurality of emoji responses respectively to the plurality of messages, and a plurality of text-reactions respectively to the plurality of messages. Each of the plurality of text reactions comprises one or more selected from the group of: a word, a phrase, and a combination thereof. The word, phrase and combination thereof each is generated by combining one or more of the corresponding emoji responses. That is, each of the plurality of text reactions is generated by combining and summarizing corresponding emoji responses of the plurality of emoji responses.

As described herein, the predictive model may comprises one or more ML models. The various ML models may comprise supervised learning (e.g., classification and regression), unsupervised learning (e.g., pattern recolonization and cluster analysis), semi-supervised learning, reinforcement learning, self-learning, feature learning (e.g., sparse dictionary learning), associate rules and anomaly detection. The various ML models can utilize various neural network, such as convolutional neural networks ("CNN") or recurrent neural networks ("RNN"). A CNN can include one or more convolutional layers (e.g., often with a subsampling step) and then followed by one or more fully connected layers as in a standard multilayer neural network. CNNS can utilize local connections, and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units.

RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

For training the predictive model at step 205, supervised ML models may be used. The supervised ML models may take as inputs the plurality of messages and the plurality of emoji responses respectively to the plurality of messages and take as outputs the plurality of text reactions respectively to the plurality of messages. The plurality of messages, the plurality of emoji responses respectively to the plurality of messages and the plurality of text reactions respectively to the plurality of messages are referred to as labeled training data. The mapping relationship or function can be inferred by the ML models to map the inputs to the outputs by analyzing the training data. Each of the plurality of text reactions is labeled as a proper text reaction that is generated from the emoji responses to the one corresponding message. As used herein, labeling a text reaction is to tag the text reaction with one or more labels to augment the text reaction with meaningful tags that are informative. For example, labels might indicate which words/terms are contained in the text reaction as a response to the sent message (e.g., happy, sad and/or angry), what the overall sentiment of the text reaction is, etc. Labels can be obtained by asking humans to make judgments about an unlabeled text reaction (e.g., Does this text reaction contain a word "agreement"?). After obtaining a labeled dataset, the ML models can derive the mapping relationship or function to map the inputs to the outputs by analyzing the training dataset. The ML models can then be applied to a new originating message and its emoji responses to predict a text reaction for that new originating message.

Patten recognition may be used to analyze and classify the inputs. As used herein, pattern recognition may refer to the automated recognition of patterns and regularities in the emoji responses. For example, each emoji response may be considered as an image of a character, and features may be extracted from the image to reduce the dimensionality of the representation and to make the recognition process computationally efficient. These features are compared with an abstract vector-like representation of a character. Nearest neighbor classifiers such as the k-nearest neighbors algorithm can be used to compare image features with stored character features. The k-nearest neighbors algorithm (k-NN) is a non-parametric method used for classification and regression. In the example, the input consists of the k closest training examples in the feature space.

In step 210, a message may be sent by a user associated with the first user device to the second user device through the server. The message may be referred to as an originating message. The originating message may be stored by the server in the database and then forwarded by the server to the second user device (step 215). The originating message may comprise texts, emojis and/or images. The communications among the devices and the server can be performed via the network 150, which can be one or more of a wireless network, a wired network or any combination of wireless network and wired network. The communications may comprise, for example, HTTP, SSL communications, HTTPS communications, and browser-based communications, but are not limited thereto.

Upon receiving the originating message by the second user device, a user associated with the second user device may respond to the originating message using one or more emojis (step 220). The one or more emoji responses may be sent one at a time or simultaneously by the user associated with the second user device. The one or more emoji responses may first be received by the server and stored in the database. The server may then forward the one or more emoji responses to the first user device as responses to the originating message (step 225).

In this example, the above message and emoji responses communications may be performed between the first user device, the server, the database and the second user device through a front channel via a network such as the network 150 in FIG. 1. The above message and emoji responses communications may utilize one or more messaging platforms installed on the first user device, the server and the second user device. For example, the one or more messaging platforms may be included in the application 113 (a client side messaging platform), the application 133 (a server side messaging platform) and the application 123 (a client side messaging platform). The client side messaging platform on the first user device may be the same or different client side messaging platform compared to the client side messaging platform on the second user device. In an example where the client side messaging platform on the first user device is different from the client side messaging platform on the second user device, a first server associated with the first user device may communicate with a second server associated with the second user device to transmit messages/responses between the first user device and the second user device. The first server and second server may coordinately implement the predictive model.

In some embodiments, the originating message may be posted or sent out to multiple second user devices, and accordingly the one or more emoji responses to the originating message may include all the emoji responses received from the multiple second user devices.

In step 230, the one or more emoji responses to the originating message are combined and summarized by the predictive model to generate a text reaction to the originating message. As described above, the mapping relationship between the inputs and the outputs can be inferred by the predictive model from the training data. Based on the inferred mapping relationship, the predictive mode takes as an input the originating message and the one or more emoji responses to output the text reaction to the originating message. For example, if the response emojis include a smiley face and five emojis of letter "A", "G", "R", "E", "E", "D", the text reaction to the originating message can be generated as "happy agreement" by combining and summarizing the response emojis by the predictive model.

In step 235, the text reaction to the originating message may be transmitted by the server to the first user device. This transmission of the text reaction may be carried out via the front channel or a back channel between the server and the first user device. The text reaction may be further encrypted during transmission for security and privacy reasons. The encryption can be performed by any suitable encryption algorithms and techniques.

In some embodiments, the originating message may be sent by the user associated with the first user device to more than one other user devices. In this situation, in addition to generating a respective text reaction based on the corresponding emoji responses from each of the user devices, the predictive model may be configured to statically summarize the respective text reaction. For example, if the originating message is sent to four recipient devices, four text reactions to the originating message can be generated by the predictive model each from one of the four recipient devices. Among the four text reactions, there may have three "happy agreement" and one "sad NO". The predictive model may be configured to summarize the four text reactions as, for example, "3 recipients responded 'happy agreement' and 1 recipient responded 'sad NO'" and/or "75% or ¾ recipients responded 'happy agreement'". Such statistical summarization may also be stored by the server in the database and be transmitted by the server to the first user device.

The text reaction to the originating message may be stored by the server in the database and associated with the originating message and the emoji responses to the originating message in the database. The originating message, the emoji responses to the originating message and the text reaction to the originating message may be used as training data to further train the predictive model.

Upon receiving the text reaction, the first user device may present the text reaction to the user associated with the first user device (step 240). The presentation can be taken in multiple forms, for example, a private message to the original poster (e.g., the user associated with the first user device and posts the originating message) from a Slack® or other messaging platform bot, an automatic reply to the originating message itself, or through an alert that is dynamically added to a HTML or XML document element via document object model (DOM) manipulations.

Figure 3:
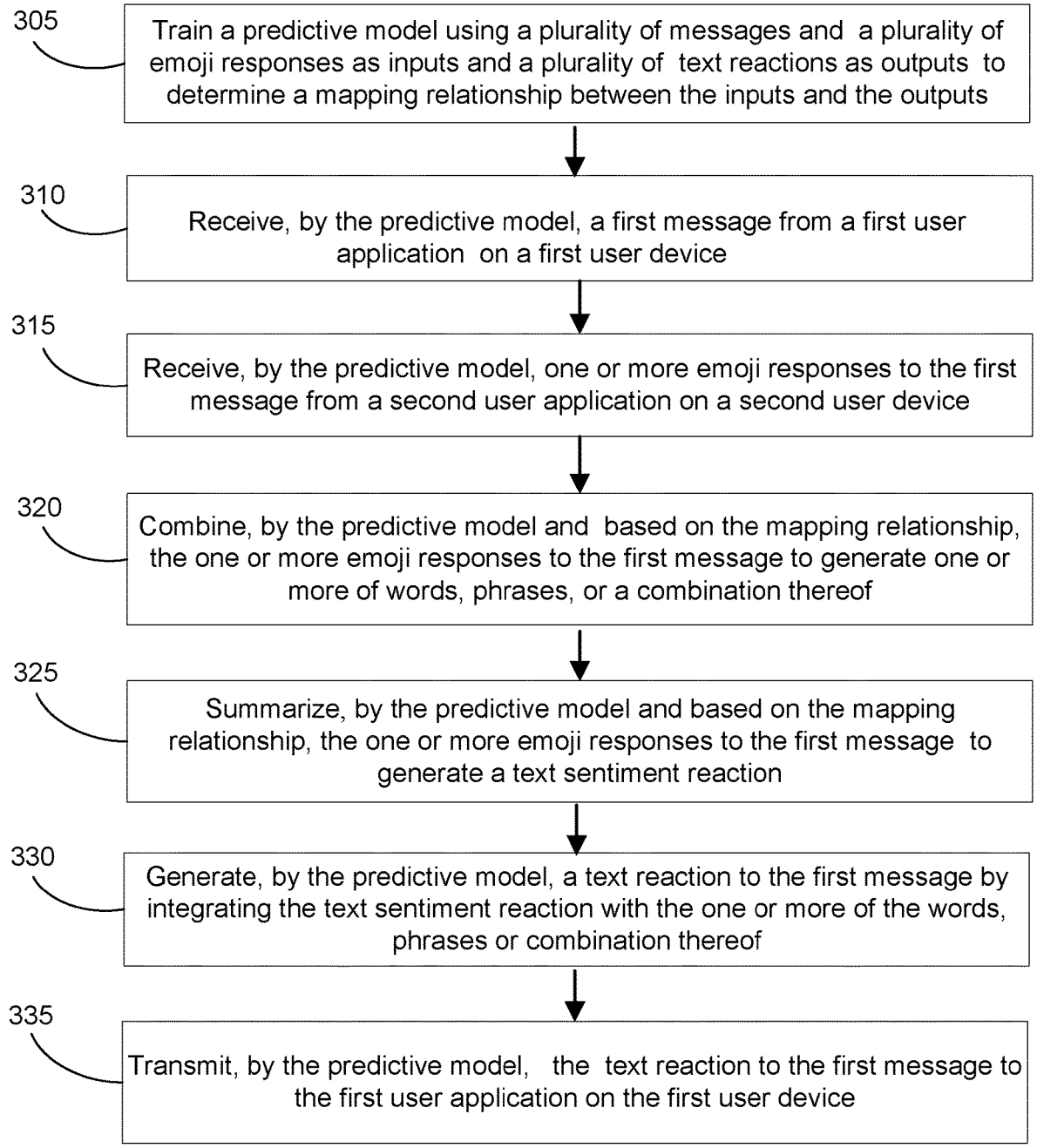
FIG. 3 is a flow chart illustrating a method of combining and summarizing emoji responses to generate a text reaction from the emoji responses according to an example embodiment.

FIG. 3 is a flow chart illustrating a method 300 of combining and summarizing emoji responses to generate a text reaction to an originating message based on the emoji responses according to an example embodiment. FIG. 3 may reference the same or similar components as those illustrated in FIGS. 1-2, including a first user device, a second user device, a server, a database, and a network. The method 3 may be implemented by the server.

The method 300 may commence at block 305, where the predictive model of the server may be trained using training data to determine a mapping relationship between the training data. For example, as described above, the training data can be stored in the database, including a plurality of originating messages, a plurality of emoji responses, and a plurality of text reactions. At least one of the plurality of emoji responses corresponds to each of the plurality of messages, at least one of the plurality of text reactions corresponds to each of the plurality of messages, and each of the plurality of text reactions is generated by combining corresponding emoji responses of the plurality of emoji responses. Each message of the plurality of messages comprises one or more selected from the group of text and emoji. Each of the plurality of text reactions comprises one or more selected from the group of: a word, a phrase, and a combination thereof. The word, phrase and combination thereof each is generated by combining one or more of the corresponding emoji responses. Each of the plurality of text reactions comprises a text sentiment reaction that is generated by summarizing one or more of the corresponding emoji responses. That is, each of the plurality of text reactions is generated by combining and summarizing corresponding emoji responses of the plurality of emoji responses. The text sentiment reaction is generated via a sentiment analysis performed by the predictive model. As discussed herein, the predictive model may utilize ML models for training. The training set can be the plurality of messages and emoji responses, including combined emoji (e.g., _E_X_C_E_L_L_E_N_T). The target (categorization) can either be the set, a score based on the set of emoji responses, a description of the overall sentiment or combined sentiment, or a combination thereof, and details of which may be referred back to the above descriptions, for example in FIG. 2.

In block 310, the predictive model may receive a first originating message from the first user application (e.g., the application 113) on the first user device. For example, as described above, the first originating message may be directed to one or more second user devices through the server. The server receives the first originating message and then forwards it to the one or more second user devices as a recipient device. The first originating message may comprise emojis, images, pictures, text, audio, video, and/or any combination thereof.

In block 315, the predictive model may receive one or more emoji responses to the first originating message from a second user application (e.g., the application 123) on the one or more second user devices. Upon receiving the first originating message by the one or more second user device, user associated with the one or more second user devices may use the second application to respond to the originating message using emojis (referred to as emoji responses). As described above, the emoji responses may include emojis of image (e.g., smiley face), emojis of letters (e.g., "A" and "B"), emojis of number (e.g., "1", "2"), emojis of punctuation (e.g., ".", ";"), emojis of symbol (e.g., "@", "#"), and/or any combination thereof. The emoji responses may be received by the server from the one or more second user devices and then be forwarded by the server to the first user device.

In block 320, the predictive mode may combine the one or more emoji responses to the first originating message based on the mapping relationship to generate one or more of words, phrases or a combination thereof from the one or more emoji responses. For example, if the one or more emoji responses include emojis of letters "A" "T" "P" and "M" and emojis of number "2", the one or more emojis may be determined and combined by the predictive model based on the mapping relationship to be a text-based response of "at 2 pm". In some embodiments, the predictive model may convert the one or more emoji responses to corresponding individual characters, and then combine the corresponding individual characters to generate the one or more of the words, phrases or combination thereof. For example, if an emoji of letter is ":a", the predictive model may first convert the ":a" to an individual character "a", then combine this individual character "a" with other characters to form a word or phrase.

In block 325, the predictive model may summarize the one or more emoji responses to the first originating message based on the mapping relationship to generate a text sentiment reaction from the one or more emoji responses. For example, if the one or more emoji responses include a smiley face, the predictive mode may perform a sentiment analysis on the smiley face to generate a "happy" sentiment reaction to the first originating message. The sentiment analysis conducted by the predictive model may comprise one or more of: natural language processing, text analysis, computational linguistics, and biometrics, to systematically identify, extract, quantify, and study affective states and subjective information from the one or more emoji responses.

In block 330, the predictive model may generate a text reaction to the first originating message by integrating the one or more of the words, phrases or combination thereof with the text sentiment reaction. In the example above, the integration of "at 2 pm" and "happy" by the predictive model can generate a text reaction of "happy at 2 pm", which may indicate the recipient of the first originating message would be "happy" to meet "at 2 pm".

In block 335, the server may transmit the text reaction to the first originating message to the first user application on the first user device. The transmission of the text reaction may be performed via a back channel of the network 150 between the server and the first user device. As described above, the text reaction can take in multiple forms, for example, a private message to the original poster (e.g., the user associated with the first user device and posts the first originating message) from a Slack® or other messaging platform bot, an automatic reply to the first originating message itself, or through an alert that is dynamically added to a HTML or XML document element via document object model (DOM) manipulations. With the text reaction, the user of the first user device who posts the first originating message can get a definite and clear understanding of how the recipient of the first originating message reacts to the first originating message. The text reaction may be further stored by the server in the database and be associated with the first originating message and the one or more emoji responses to the first originating message, which can be included in the training data for further training the predictive model.

As described above, in some embodiments, the first originating message may be sent by the user of the first user device to more than one other user devices. In one embodiment, the predictive model may perform the above process on the emoji responses received from the more than one user devices as described above. Alternatively, in addition to generating a respective text reaction based on the corresponding emoji responses from the more than one user devices, the predictive model may be configured to statically summarize the respective text reaction. For example, if the first originating message is sent to four recipient devices, four overall text-based reactions to the originating message can be generated by the predictive model each from one of the four recipient devices. Among the four overall text-based reactions, there may have three "happy agreement" and one "sad NO". The predictive model may be configured to summarize the four overall text-based reactions as, for example, "3 recipients responded 'happy agreement' and 1 recipient responded 'sad NO'" and/or "75% or ¾ recipients responded 'happy agreement'". Such statistical summarization may also be stored by the server in the database and be transmitted by the server to the first user device. With the statistical summarization, the user of the first user device who posts the first originating message can get a definite and clear understanding of how the multiple recipients of the first originating message statistically react to the first originating message.

Figure 4:
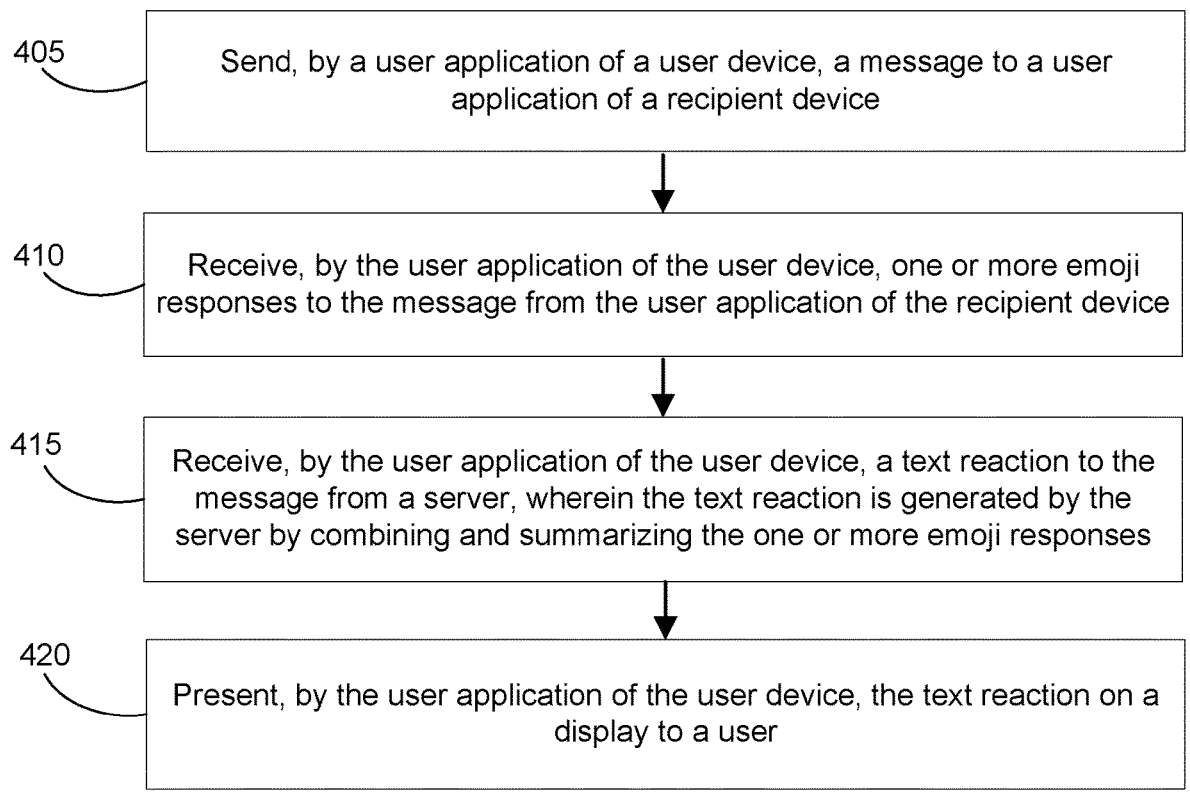
FIG. 4 is a flow chart illustrating a method of combining and summarizing emoji responses to generate a text reaction from the emoji responses according to an example embodiment.

FIG. 4 is a flow chart illustrating a method 400 of combining and summarizing emoji responses to generate a text reaction to an originating message based on the emoji responses according to an example embodiment. FIG. 4 may reference the same or similar components as those illustrated in FIGS. 1-3, including a first user device, a second user device, a server, a database, and a network. The method 400 may be implemented by the first user device. Some details may be referred back to the above description, and will not repeated herein.

In block 405, a user application executing on a user device (e.g., the first user device 110) may send an originating message to a user application executing on a recipient device (e.g., the second user device 120). In block 410, the user application of the user device may receive, one or more emoji responses from the user application of the recipient device. As described above, the predictive model of the server may generate a text reaction to the originating message based on the one or more emoji responses and transmit the generated text reaction to the user application of the user device. In block 415, the user application of the user device may receive the text reaction to the originating message from the server, wherein the text reaction is generated by the server by combining and summarizing the one or more emoji responses. In block 420, the user application of the user device may present the text reaction on the display of the user device to the user who originates the originating message. In cases where the user is a user with impaired vision, the user application of the user device can be configured to read the text reaction to the user, which can improve accessibility services for the user with impaired vision, save users' time, and improve the overall experiences of users engaging with messaging platforms. As used herein, the user application of the user device and the user application of the recipient device may be a client application of a messaging platform, such as Slack®, Apple iMessage®, etc.

As described above, in some embodiments, when the originating message is transmitted to multiple recipient devices, the user device may receive a text reaction generated by the predictive model from the emoji responses received from the multiple recipient devices. The user device may further receive a statistical summarization of all the text reactions generated by the predictive model based on the emoji responses from the multiple recipient devices. Such statistical summarization may further be presented to the user on the display or read through a screen reader to the user with impaired vision.

Figure 5A:
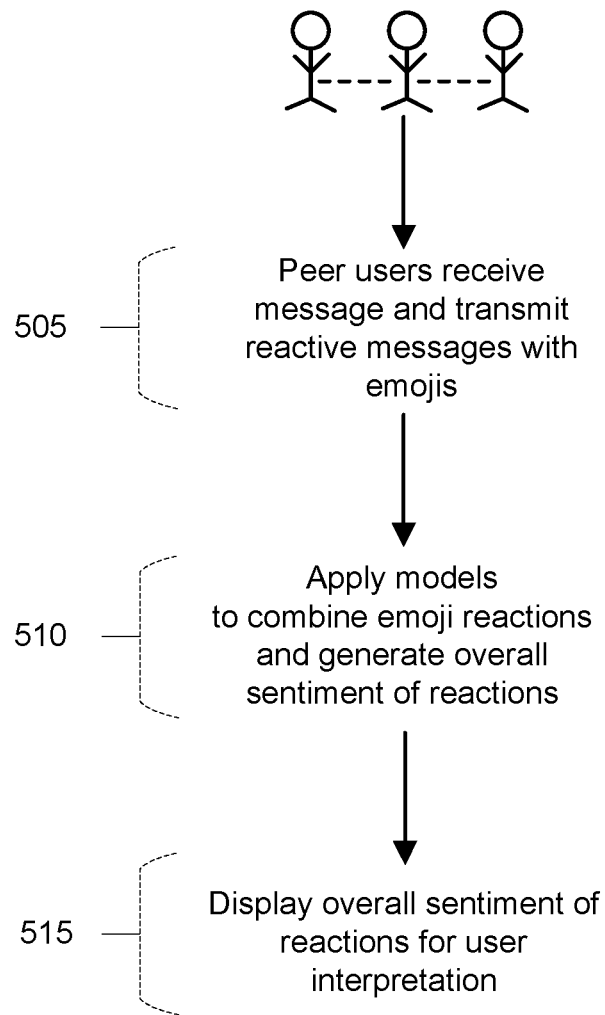
FIGS. 5A and 5B are diagrams illustrating a process of combining and summarizing emoji responses to generate a text reaction from the emoji responses according to an example embodiment.
Figure 5B:
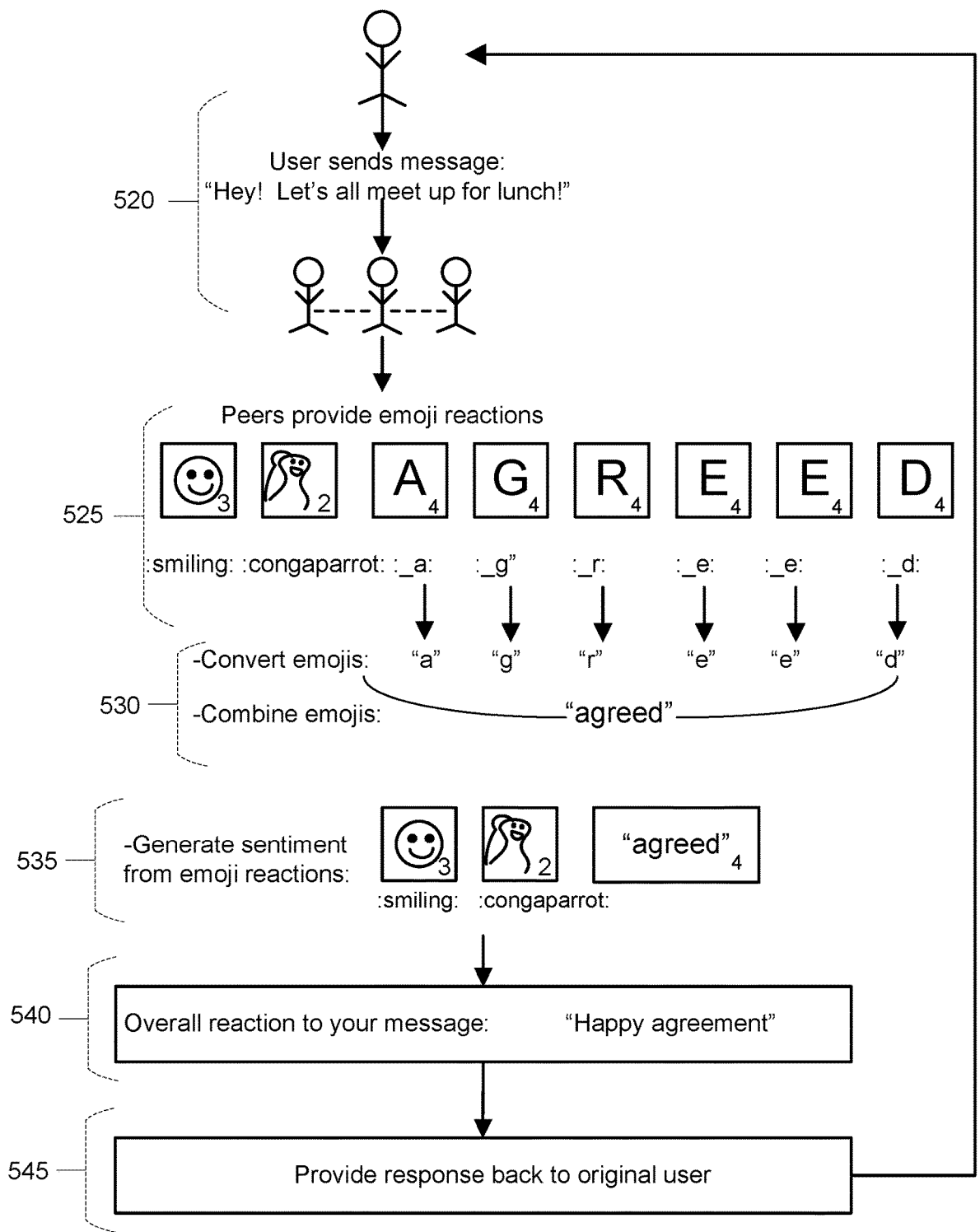

FIGS. 5A and 5B are a schematic diagram illustrating a process 500 of combining and summarizing emoji responses to generate a text reaction to an originating message based on the emoji responses according to an example embodiment. FIGS. 5A and 5B may reference the same or similar components as those illustrated in FIGS. 1-4, including a first user device, a second user device, a server, a database, and a network. Some details may be referenced back to the above description and may be repeated herein.

As shown in FIG. 5A, in block 505 Peer users can utilize user devices to send messages and react to the messages with emojis. The message can be sent by one user to one or more others via their respective user devices and displayed for each user. Each user can respond to the message with a reactive message, which can include one or more emojis. In block 510, upon receipt of one or more reactive messages containing at least one emoji, one or more predictive models can be applied. The predictive models can be trained to interpret each emoji and, if more than one emoji is present, combine multiple emojis, to generate an overall sentiment of the one or more reactive messages. The training can produce a mapping relationship between the sent messages, the emoji responses of the reactive messages, the combined emoji reactions, and the generated overall sentiment of reactions.

The mapping relationship can be used by the predictive model to analyze new messages and emoji responses in the new reactive messages, and generate an overall sentiment.

In block 515, the overall sentiment of the one or more reactive messages can be displayed in textual form for the user's view. This may aid the user's interpretation of the one or more reactive message and in composing a follow-up message or taking other action.

In block 520, a user may send out a message, such as "Hey! Let's all meet up for lunch!", to one or more peer users. Each peer user may use a user device (e.g., the first user device 110 and second user device 120) to send and/or receive the message.

In block 525, each peer user may provide their own emoji responses to the message. Those emoji responses may be received by the predictive model. The predictive model may classify, count and add up the emoji responses to perform statistical analysis on the emoji responses. In this example, there have three smiling faces, two congaparrots, four emojis of letter "A", four emojis of letter "G", four emojis of letter "R", four emojis of letter "E", four emojis of letter "E", and four emojis of letter "D".

In block 530, based on the produced mapping relationship, the predictive model may convert some of the emoji responses into individual characters. In this example, the emoji of letter ":_a" is converted into a character "a", the emoji of letter ":_g" is converted into a character "g", the emoji of letter ":_r" is converted into a character "r", the emoji of letter ":_e" is converted into a character "e", the emoji of letter ":_e" is converted into a character "e", and the emoji of letter ":_d" is converted into a character "d". The predictive model may further combine those individual characters to generate a word or phrase, such as four "agreed" words can be generated by combining the above individual characters.

In block 535, the predictive model is configured to further generate sentiment from the emoji reactions. In this example, the predictive model may use sentiment analysis to analyze the emojis of smiling face and the emojis of congaparrot to produce a reaction sentiment to the message. In some embodiments, the sentiment analysis may also performed on the generated word/phrase from the block 520, for example via emotion or tone analysis of natural language processing, to generate reaction sentiment.

In block 540, by summarizing the reaction sentiment from the block 525 and the generated word/phrase from the block 520, the predictive model may produce a text reaction to the message as "Happy agreement".

In block 545, the produced text reaction to the message is provided to the user who sent out the message in the block 510. As described above, the text reaction can be presented to the user in various forms. Such text reaction can give the user who sent out the message a clear, simple summary of reactions from each and all of the peer users who receive the message, both individually and statistically.

Figure 6:
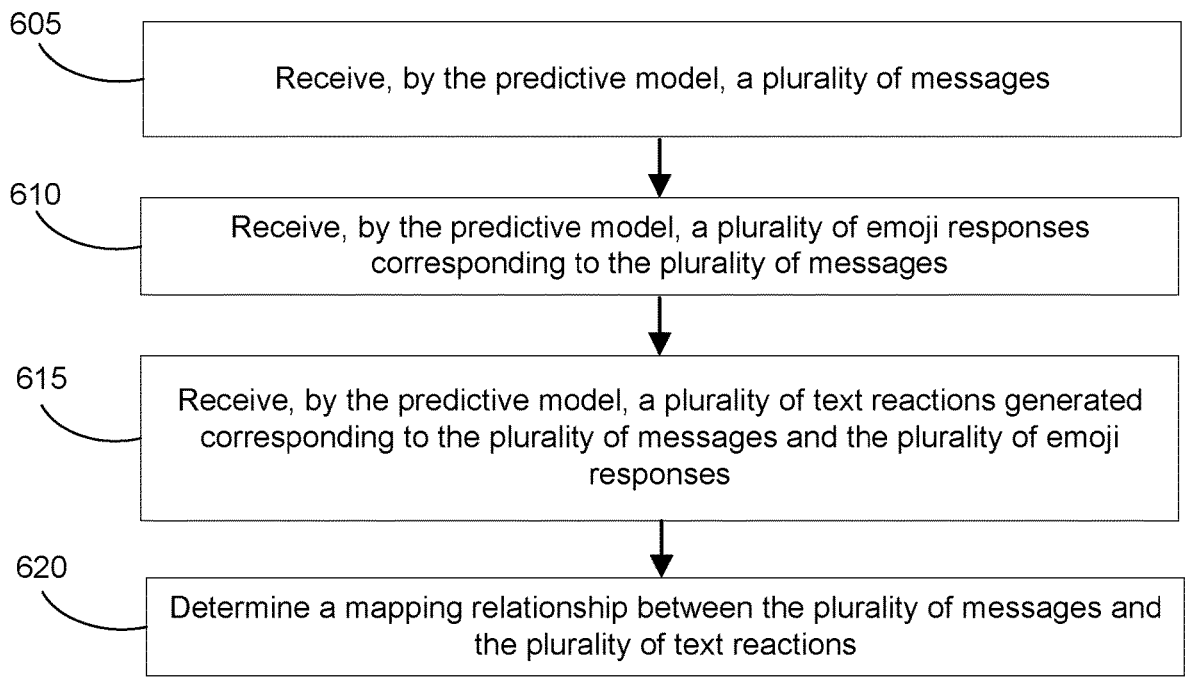
FIG. 6 is a flowchart illustrating an example training process of a predictive model according to an example embodiment.

FIG. 6 describes a training process of the predictive model according to an example embodiment. FIG. 6 may reference the same or similar components as those illustrated in FIGS. 1-5, including a first user device, a second user device, a server, a database, and a network.

In step 605, the predictive model of the server may receive a plurality of messages. The plurality of messages may be received from one or more of the first user device. The plurality of messages may also be received from one or more of the second user device. For example, the plurality of messages may be sent by users of the first user devices to users of the second user devices as destination end users, and vice versa. The server may receive, store, forward, and analyze the plurality of messages. Each of the plurality messages may be a text message, an emoji message, or a combination thereof.

In step 610, the predictive model of the server may receive a plurality of emoji responses corresponding to the plurality of messages. At least one of the plurality of emoji responses corresponds to each of the plurality of messages. For example, a user of the first user device may send a text message to a user of at least one of the second user device. The user of at least one of the second user device may respond to the text message using one or more emojis. The one or more emojis may comprise numerical emojis, letter emojis, and/or graphical emojis.

In step 615, the predictive model of the server may receive, a plurality of text reactions generated corresponding to the plurality of messages and the plurality of emoji responses. Each of the plurality of text reactions may comprise one or more of a word and a phrase. The word and/or phrase each is generated by combining one or more of the corresponding emoji responses. The combining may comprise converting the one or more emoji responses to corresponding individual characters and combining the corresponding individual characters to generate the corresponding words and/phrases. Each of the plurality of text reactions may also comprise a text sentiment reaction that is generated by summarizing one or more of the corresponding emoji responses. For example, if one emoji is a smiley face emoji, then the text sentiment reaction may comprise a word of "happy". The text sentiment reaction may be generated via a sentiment analysis algorithm performed by the predictive model.

In step 620, the predictive model of the server may determine a mapping relationship between the plurality of messages and the plurality of text reactions. By receiving the plurality of messages and the plurality of emoji responses as inputs and the plurality of text reactions as outputs, the predictive model can analyze the inputs and outputs to identify a relationship between the plurality of messages and the plurality of text reaction. That is, the predictive model can be trained to identify a relationship to map how the plurality of text reactions to correspond to the plurality of messages. Such relationship can be used to predict a text reaction to a newly sent message by referring to an emoji response to the newly sent message. The relationship may be adjusted, modified, and/or updated to further accurately predict a text reaction by iteratively training the predictive model, for example, using more new inputs and outputs.

Figure 7:
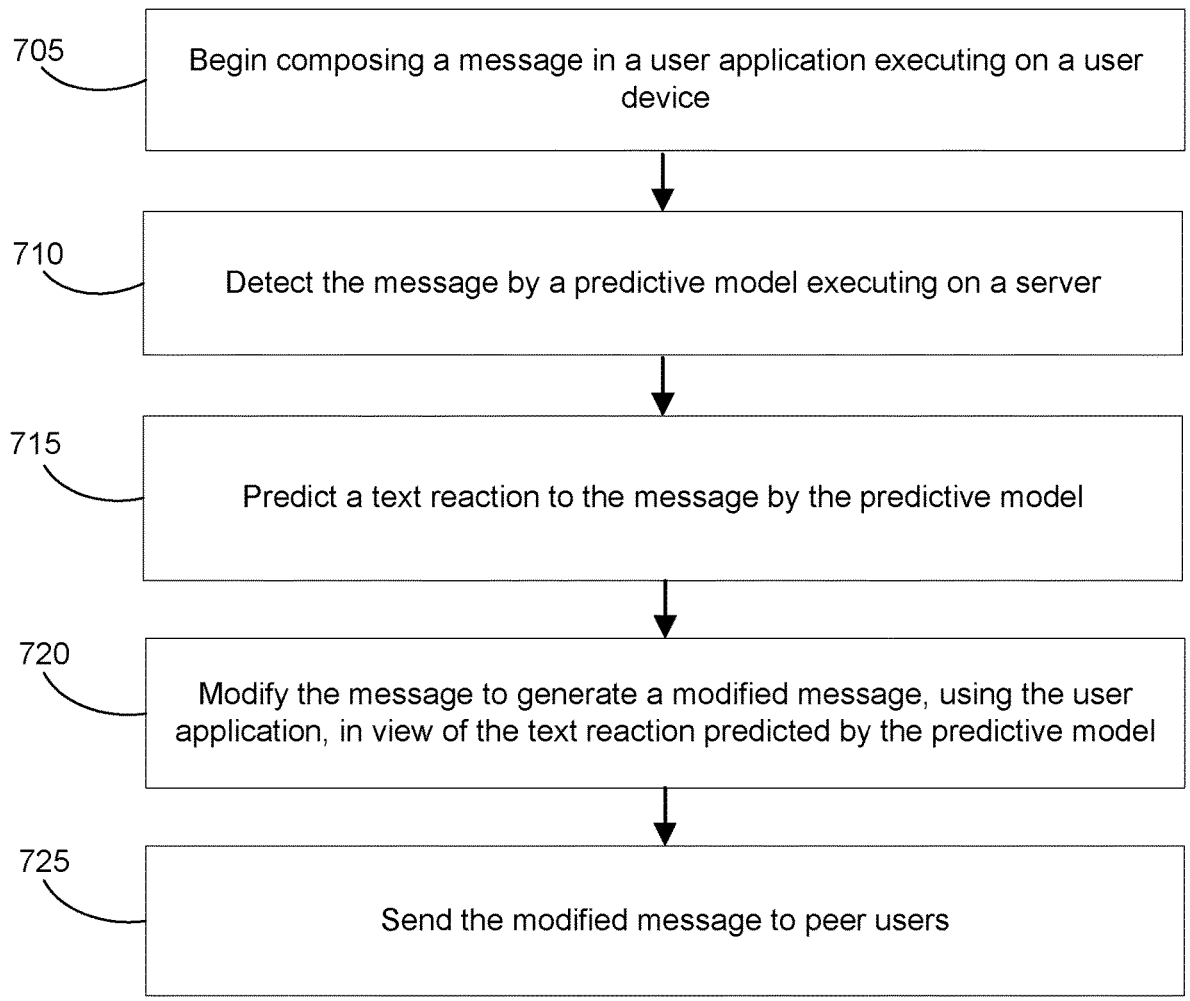
FIG. 7 is a flowchart illustrating an example process of composing a message using a predictive model according to an example embodiment.

FIG. 7 describes an example process of composing a message and modifying the message based on the predictive model according to an example embodiment. FIG. 7 may reference the same or similar components as those illustrated in FIGS. 1-6, including a user device, a server, a database, and a network As described above, the predictive model can be trained to proactively predict what emoji responses and/or sentiment of reaction might be to an originating message, which can prompt the sender of the originating message to edit the originating message so that the sender is able to compose a message that will be interpreted as intended and that is likely to get the desired responses and/or sentiment of reaction. Therefore, the sender of the originating message may be able to get desired emotion and/or voice from the emoji responses. Being able to have the predictive model that is trained to predict which emojis might react to the sent message, will be helpful in ensuring that a message is being interpreted by the recipient as the sender intends. For example, instances where a message intended to be factual is interpreted harshly may be avoided, and instances where a message that is intended to be firm is not interpreted as soft. Not coming across too harshly when it is meant factually, or not coming across too soft when it is intended to be firm. It helps to properly adjust the voice and the emotion of the messages. In addition, the use of the predictive model on originating messages may help users who otherwise wouldn't use emojis to feel comfortable doing so.

In step 705, a user of a user device (e.g., the first user device 110) starts composing an originating message, using a user application executing on the user device. As described above, the originating message may comprise text, emojis, and/or a combination thereof. The user application may be a client application of a messaging platform, such as Slack®.

In step 710, the predictive model on the server can detect the originating message composed by the user. The user application of the user device is in data communication via the network 150 with an application (e.g., the application 133) executing on the server. The application of the server can comprise a server application of the messaging platform, such that the predictive model can detect the originating message via the server application prior to the originating message being sent by the user.

In step 715, the predictive model may predict a text reaction to the originating message. As described above, the text reaction can be generated by the predictive model by combining and summarizing one or more predicted emoji responses to the originating message. Upon detecting the originating message, the predictive model may predict what emojis might be to respond to the originating message. The predicted emojis may be combined and analyzed by the predictive model to determine the text reaction, as described above, which are not detailed herein.

In step 720, the originating message may be modified/edited to generate a modified originating message, by the user using the user application of the user device, according to the text reaction predicted by the predictive model. For example, based on the predicted text reaction, the user may delete, add and/or change one or more words and/or one or more emojis in the originating message, such that the user can expect desired emoji responses and/or text responses.

In step 725, the modified originating message may be sent to peer users by the user using the user application of the user device. Once the modified originating message is finalized by the user, the user may send out the modified originating message to peer users. In some embodiments, the modified originating message may be further edited/modified by the user according to a further text reaction predicted on the modified originating message by the predictive model, until the user can compose a message that produces expected emoji/text responses. This would allow the user, particularly a user who is visually impaired or otherwise can't easily interpret emojis, to effectively use emojis, and compose messages using them that have the correct intent.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A messaging system, comprising:
   a processor; and
   a memory, the memory storing a database containing a plurality of messages, a plurality of emoji responses, and a plurality of text reactions, wherein:
   at least one of the plurality of emoji responses corresponds to each of the plurality of messages,
   at least one of the plurality of text reactions corresponds to each of the plurality of messages, and
   each of the plurality of text reactions is generated by combining corresponding emoji responses of the plurality of emoji responses; and
   a predictive model trained using the plurality of messages and the plurality of emoji responses as inputs and the plurality of text reactions as outputs, wherein the predictive model is configured to:

determine a mapping relationship between the inputs and the outputs, receive a first message from a first user application comprising instructions for execution on a first user device, receive one or more emoji responses to the first message from a second user application comprising instructions for execution on a second user device, combine the one or more emoji responses to the first message based on the mapping relationship to generate at least one selected from the group of words and phrases, summarize the one or more emoji responses to the first message based on the mapping relationship to generate a text sentiment reaction, generate a text reaction to the first message by integrating the text sentiment reaction with the generated at least one selected from the group of words and phrases, and transmit the text reaction to the first message to the first user application on the first user device.

2. The system of claim 1, wherein:
each message of the plurality of messages comprises one or more selected from the group of text and emoji.

3. The system of claim 1, wherein:
each of the plurality of text reactions comprises one or more selected from the group of a word and a phrase; and
the word and phrase each is generated by combining one or more of the corresponding emoji responses.

4. The system of claim 1, wherein:
each of the plurality of text reactions comprises a text sentiment reaction that is generated by summarizing one or more of the corresponding emoji responses.

5. The system of claim 1, wherein combining the one or more emoji responses to the first message based on the mapping relationship comprises:
converting the one or more emoji responses to corresponding individual characters; and
combining the corresponding individual characters to generate the at least one selected from the group of words and phrases.

6. The system of claim 1, wherein:
the text sentiment reaction to the first message is generated via a sentiment analysis algorithm performed by the predictive model.

7. The system of claim 1, wherein:
the text reaction to the first message is transmitted as a private message to the first user application on the first user device.

8. The system of claim 1, wherein:
the text reaction to the first message is transmitted as an automatic reply message to the first user application on the first user device.

9. The system of claim 1, wherein:
the text reaction to the first message is transmitted as an alert to the first user application on the first user device.

10. The system of claim 1, wherein the predictive model is configured to generate an overall sentiment based on the mapping relationship.

11. The system of claim 10, wherein the predictive model is configured to assign a sentiment score to the overall sentiment.

12. A method, comprising:
training a predictive model using a plurality of messages and a plurality of emoji responses as inputs and a plurality of text reactions as outputs to determine a mapping relationship between the inputs and the outputs;

receiving, by the predictive model, a first message from a first user application comprising instructions for execution on a first user device;

receiving, by the predictive model, one or more emoji responses to the first message from a second user application comprising instructions for execution on a second user device;

combining, by the predictive model, the one or more emoji responses to the first message based on the mapping relationship to generate at least one selected from the group of words and phrases;

summarizing, by the predictive model, the one or more emoji responses to the first message based on the mapping relationship to generate a text sentiment reaction;

generating, by the predictive model, a text reaction to the first message by integrating the text sentiment reaction with the generated at least one selected from the group of words, and phrases; and transmitting, by the predictive model, the text reaction to the first message to the first user application on the first user device, wherein:
the plurality of messages, the plurality of emoji responses, and the plurality of text reactions are stored in a database,
at least one of the plurality of emoji responses corresponds to each of the plurality of messages,
at least one of the plurality of text reactions corresponds to each of the plurality of messages, and
each of the plurality of text reactions is generated by combining corresponding emoji responses of the plurality of emoji responses.

13. The method of claim 12, wherein:
each message of the plurality of messages comprises one or more selected from the group of text and emoji.

14. The method of claim 12, wherein:
each of the plurality of text reactions comprises one or more selected from the group of a word and a phrase; and
the word and phrase each is generated by combining one or more of the corresponding emoji responses.

15. The method of claim 12, wherein:
each of the plurality of text reactions comprises a text sentiment reaction that is generated by summarizing one or more of the corresponding emoji responses.

16. The method of claim 12, wherein combining the one or more emoji responses to the first message based on the mapping relationship comprises:
converting, by the predictive model, the one or more emoji responses to corresponding individual characters; and
combining, by the predictive model, the corresponding individual characters to generate the at least one selected from the group of words and phrases.

17. The method of claim 12, wherein:
the text sentiment reaction to the first message is generated by the predictive model via a sentiment analysis algorithm.

18. The of claim 12, wherein:
the text reaction to the first message is transmitted by the predictive model as a private message to the first user application on the first user device.

19. The method of claim 12, wherein:
the text reaction to the first message is transmitted by the predictive model as an automatic reply message to the first user application on the first user device.

20. The method of claim 12, wherein:
the text reaction to the first message is transmitted by the predictive model as an alert to the first user application on the first user device.

* * * * *